Figure 1:
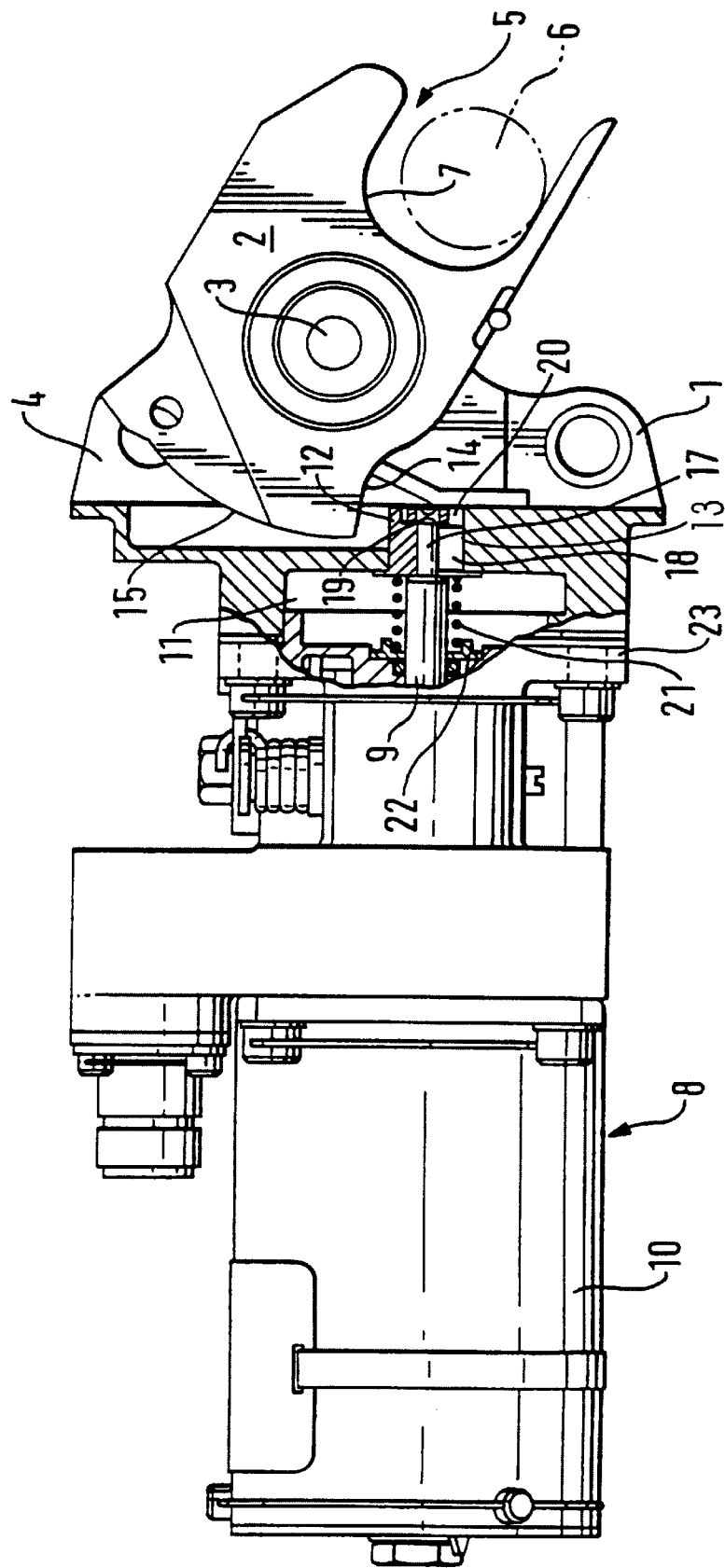

United States Patent [19]
Mountney

[11] Patent Number: 5,953,904
[45] Date of Patent: Sep. 21, 1999

[54] LOCK FOR ENGINE THRUST REVERSER

[75] Inventor: Arthur Derek Mountney, Telford, United Kingdom

[73] Assignee: Dowty Boulton Paul Limited, Wolverhampton, United Kingdom

[21] Appl. No.: 08/836,972

[22] PCT Filed: Sep. 25, 1996

[86] PCT No.: PCT/GB96/02363

§ 371 Date: May 22, 1997

§ 102(e) Date: May 22, 1997

[87] PCT Pub. No.: WO97/12141

PCT Pub. Date: Apr. 3, 1997

[30] Foreign Application Priority Data

Sep. 25, 1995 [GB] United Kingdom .................... 9519519

[51] Int. Cl.⁶ ........................................................ F02K 3/02
[52] U.S. Cl. .................................. 60/226.2; 239/265.29; 244/110 B
[58] Field of Search ...................... 60/226.7; 239/265.19, 239/265.29, 265.33; 292/216, 207; 244/110 B

[56] References Cited

U.S. PATENT DOCUMENTS 5,735,557  4/1998  Harvey ............................... 239/265.29

FOREIGN PATENT DOCUMENTS

| 534833 | 3/1993 | European Pat. Off. . |
| 542611 | 5/1993 | European Pat. Off. . |
| 580352 | 1/1994 | European Pat. Off. . |
| 646718 | 4/1995 | European Pat. Off. . |

*Primary Examiner*—Charles G. Freay
*Attorney, Agent, or Firm*—Michael J. Ram, D. Sc.; Loeb & Loeb LLP

[57] ABSTRACT

A lock for an engine thrust reverser comprises a latch member (2) that cooperates with a thrust reverser door to keep it closed. An actuator plunger (9) moves longitudinally to cooperate with the latch member (2) to hold it against movement that would allow the door to open. Either a sleeve (12) is located longitudinally on the plunger (9) so that opposite lateral sides thereof are engaged between the latch member (2) and a fixed abutment (13) to hold the door closed, or the plunger controls a pivoted pawl (32) that is loaded in compression by the latch member (2) when under a door-opening load.

2 Claims, 2 Drawing Sheets

LOCK FOR ENGINE THRUST REVERSER

This invention relates to a lock for an engine thrust reverser.

Aero jet engines are commonly provided with a thrust reverser system comprising a number of doors in the engine housing which are normally kept closed and do not impede the rearward flow of jet gases, but which are openable to direct at least a part of the jet gas flow forwards to generate a reverse thrust, aircraft braking action. For reasons of safety, operation of a thrust reverser system is tightly controlled and locks are provided to hold the doors in their closed position until the need for reverse thrust is confirmed. In some applications, for example, when these locks are provided as a back-up to primary locks for extra safety, they will not normally be loaded. However, if they do become loaded because of a system failure, it is critical that they should not be operated to allow the doors to open.

In these circumstances, it has been proposed that the opening load applied to each back-up lock should be transferred to a lock release mechanism so as to actively impede or prevent release of the back-up lock. The proposed lock release mechanism takes the form of a solenoid with a spring-loaded plunger that cooperates with a ratchet formation on the back-up lock, the back-up lock being a pivoted latch member mounted so that the ratchet formation displaces the plunger against its spring loading when the latch member is rotated to a door closed position, and the return spring action of the plunger causes it to automatically engage an abutment shoulder of the ratchet formation to hold the latch member in the door closed position. Any opening load applied to the latch member by the door is then applied through the abutment shoulder to one side of the plunger and reacts against a fixed abutment on the opposite side of the plunger so that the end of the plunger is trapped between the abutment shoulder and the fixed abutment with sufficient force to resist axial movement of the plunger by energisation of the solenoid.

A problem with this proposed lock release mechanism is that it is vulnerable to damage by the door opening load applied laterally to the plunger of the solenoid so that it no longer works freely in the solenoid. This represents a serious shortcoming in such a safety-critical assembly.

An object of the present invention is to provide an improved lock for an engine thrust reverser, in particular, a lock in which the aforesaid problem is mitigated.

According to one aspect, the invention consists in a lock for an engine thrust reverser comprising a latch member adapted to cooperate with a thrust reverser door to keep it closed, an actuator with a plunger that moves longitudinally to cooperate with the latch member to hold it against movement that would allow the door to open, and a sleeve member located longitudinally on the plunger so that opposite lateral sides thereof are engaged between the latch member and a fixed abutment, whereby it is restrained against longitudinal movement by a door opening load applied to the latch member, said sleeve having a lateral clearance with the plunger so that the plunger is substantially isolated from the forces acting laterally on the sleeve.

The latch member may be a pivoted latch member and the actuator may be a solenoid-operated actuator with a spring-loaded plunger, as in the aforesaid known lock release mechanism. However, instead of the end of the plunger being engaged by an abutment shoulder of the latch member on one side and a fixed abutment on the other side, the abutment shoulder and fixed abutment engage opposite sides of the sleeve member on the plunger, and any consequential lateral movement of the sleeve member is accommodated by its lateral clearance with the plunger and is not transferred to the plunger. However, the longitudinal location of the sleeve member on the plunger serves to lock the two together longitudinally for normal engagement and disengagement with the latch member.

According to another aspect, the invention consists in a lock for an engine thrust reverser comprising a latch member adapted to cooperate with a thrust reverser door to keep it closed, a pivoted pawl or locking lever adapted to cooperate with the latch member to hold it against movement that would allow the door to open and which is loaded in compression by a door opening load transferred from the latch member, and an actuator that is connected to the locking lever and is operable to disengage the locking lever from engagement by the latch member provided the locking lever is not loaded in compression by said door opening load.

The actuator preferably comprises a plunger that moves longitudinally and is connected to the locking lever at a point intermediate the pivot axis of the locking lever and its point of engagement with the latch member. The connection between the plunger and the locking lever is preferably adapted so that said door opening load when applied to the locking lever is not transferred to the plunger. The actuator is preferably a solenoid-operated actuator with a spring-loaded plunger.

Figure 2:
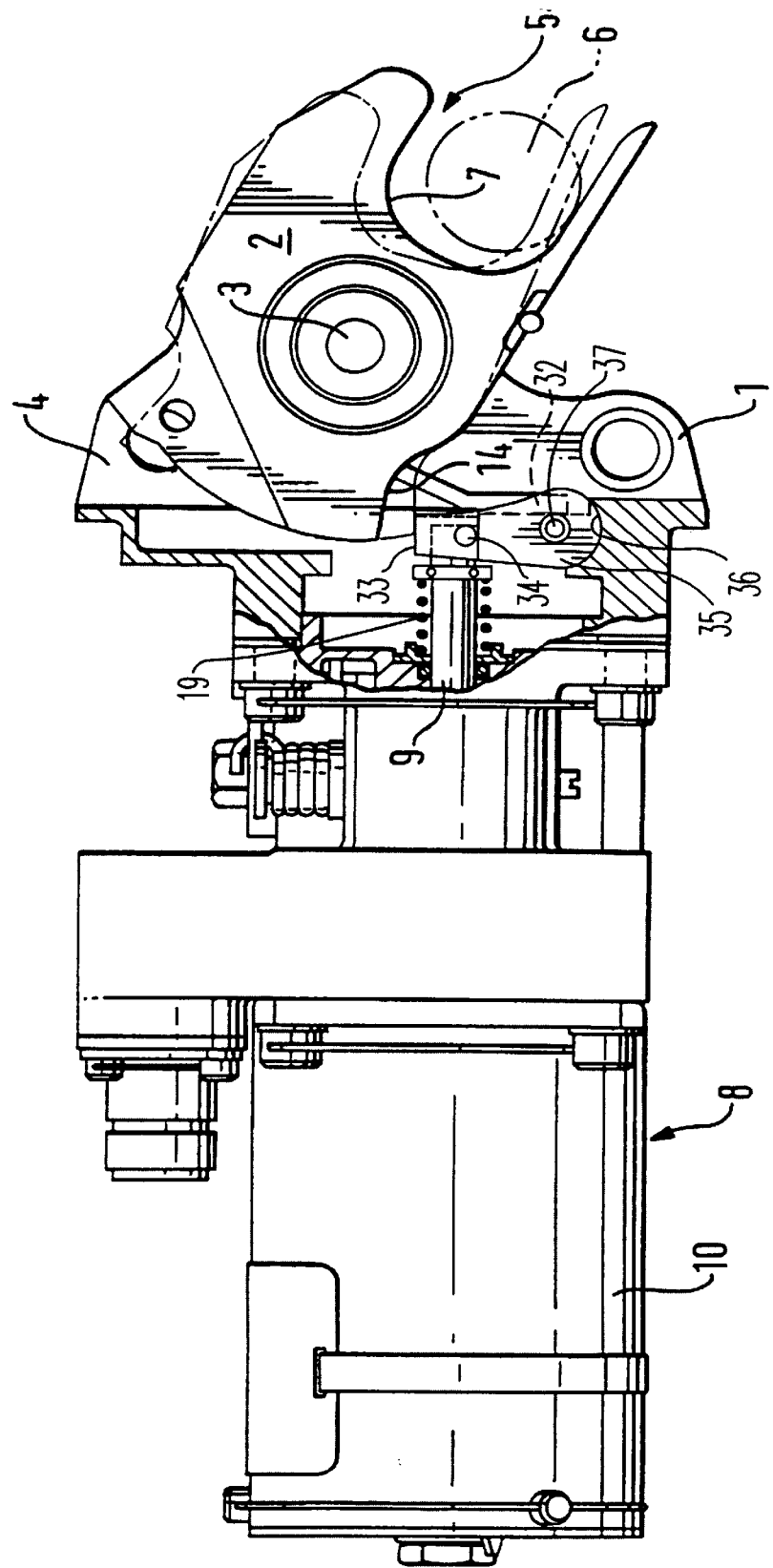

The invention will now be described by way of example with reference to the accompanying drawings, in which:

FIG. 1 is a schematic side elevation section of a tertiary lock for an aero engine thrust reverser according to a first embodiment of the invention; and FIG. 2 is a schematic side elevation section of a tertiary lock for an aero engine thrust according to a second embodiment of the invention.

The tertiary lock illustrated in FIG. 1 comprises a mounting plate I adapted for connection to an aero jet engine. A forked latch member 2 is pivotally connected to the plate 1 by a pivot pin 3 supported between a pair of lugs 4 integral with the plate 1. A U-shaped notch 5 in the latch member 2 is adapted to cooperate with a pin 6 connected to a thrust reverser door in the housing of the jet engine (not shown) so that the pin 6 engages within the notch 5, as shown in FIG. 1, when the door is fully closed and held locked by primary and secondary locks (not shown). If the primary and secondary locks are operated to release the door or fail, then the pin 6 will move with the door and engage a side wall of the notch 5. As shown in FIG. 1, the pin 6 will move anti-clockwise about the pivot pin 3 and engage the shorter sidewall 7. Further movement of the pin 6 with the door then depends upon the setting of a solenoid-operated actuator 8 mounted on the opposite side of the plate 1 from the latch member 2.

A spring-loaded plunger 9 extends from the solenoid 10 of the actuator 8 through an opening 11 in the plate 1, and carries a sleeve 12 at its free end which extends into the opening 11 when the solenoid 10 is de-energised. In this condition, the sleeve 12 lies closely adjacent to an edge 13 of the opening 11 which serves as a fixed abutment surface. The sleeve 12 also lies in the path of anti-clockwise movement of the latch member in the door opening direction, and therefore an abutment shoulder 14 on the latch member 2 engages the sleeve 12 and traps it against the abutment surface 13. Further movement of the pin 6 and consequential opening of the thrust reverser door are therefore prevented.

Furthermore, the fact that the latch member 2 serves to trap the sleeve 12 against the abutment surface 13 means that the sleeve 12 and plunger 9 cannot then be withdrawn to release the latch member, the maximum force exerted by the solenoid 8 being deliberately set as insufficient to release the latch member 2 against the force of the door opening load. This is an important safety feature of the design.

It will be appreciated that if the solenoid 8 is energised before the primary and secondary locks are released, then when the latter are released, the latch member 2 will not restrain the opening movement of the door because the sleeve 12 will be clear of the path of the abutment shoulder 14.

Furthermore, if the latch member 2 is rotated clockwise by the pin 6 wh en the door is closed, a cam surface 15 on the latch member 2 engages the end of the plunger 9 and sleeve 12 and displaces the plunger 9 into the solenoid 8 until the abutment shoulder 14 passes the end of the plunger, whereupon the spring loading of the plunger causes it to engage behind the abutment shoulder to hold the latch member in the door closed position illustrated in FIG. 1

A spring 16, such as a torsion spring, cooperates with the latch member 2 to urge the latter in the anti-clockwise, door unlocking or release direction.

It is a particularly advantageous feature of this design that the sleeve 12 has lateral clearance with the plunger 9 so that lateral movement of the sleeve 12 as it is clamped between the abutment shoulder 14 and abutment surface 13 is not transferred to the plunger. The sleeve 12 has a longitudinal slot 18 through which it is fitted into a reduced end portion 17 of the plunger 9 and retained longitudinally thereon by a full diameter portion 19 at the end of the plunger which abuts a recess 20 in the end of the sleeve 12. A coiled compression spring 21 is fitted around the plunger 9 between the sleeve 12 and a wall 22 of solenoid support 23 so as to act as the plunger return spring.

An alternative embodiment of the invention is illustrated in FIG. 2 which is very similar in many respects to that of FIG. 1, the same reference numerals therefore being used for similar components. However, the major significant difference lies in the fact that the sleeve 12 in the embodiment of FIG. 1 is replaced by a pivoted pawl or locking lever 32 which is pivotally mounted on the plate 1 so that it extends longitudinally therefrom and cooperates with the abutment shoulder 14 at its free end 33. The locking lever 32 is therefore loaded in compression when it lies on the path of the latch member and resists a door opening load.

However, the plunger 9 of the solenoid 8 is connected to the locking lever 32 at 34 so that when the solenoid is energised, the locking lever 32 is withdrawn from the path of the latch member 2, of the locking lever 32 is not already subject to a compressive door opening load which would prevent it from being operated by the solenoid to allow door opening.

The locking lever 32 is pivotally mounted on the plate 1 by having its base 35 received as an arcuate rotary fit in a recess 36 in the plate 1 so that it is more readily locked against rotation by the frictional forces generated at the arcuate interface when the compressive door opening load is applied. A pin and hole connection 37 is provided between the locking lever and plate 1 to locate the two at the centre of rotation of the locking lever, but the fit between the two is a loose fit so that the arcuate recess 36 defines the centre of rotation rather than the pin and hole connection 37, and any loads are transmitted directly to the arcuate interface.

The connection 34 between the free end of the plunger 9 and the locking lever 32 takes the form of a pin and slot connection which keys longitudinal movement of the plunger to the lever, but allows relative lateral movement of the pin in the slot along the longitudinal line of compressive loading of the locking lever 32. No loading of the locking lever 32 is therefore transferred to the plunger 9.

The radius of rotation of the locking lever 32 at the point of connection 34 to the plunger serves to increase the mechanical advantage of the lock release mechanism so that the operating force required from the solenoid-operated actuator 8 is reduced.

I claim:

1. A lock for an engine thrust reverser comprising a latch member adapted to cooperate with a thrust reverser door to keep it closed, and a pivoted locking lever adapted to cooperate with the latch member to hold it against movement that would allow the door to open, characterised in that the locking lever (32) is loaded in compression by a door opening load transferred from the latch member (2), and an actuator (8) is provided that is connected to the locking lever (32) and is operable to disengage the locking lever (32) from engagement by the latch member (2) provided the locking lever (32) is not loaded in compression by said door opening load, the actuator (8) comprising a plunger (9) that moves longitudinally and is connected to the locking lever (32) at a point intermediate the pivot axis (37) of the locking lever (32) and its point of engagement with the latch member (2).

2. A lock as claimed in claim 1 in which the connection between the plunger (9) and the locking lever (32) is adapted so that said door opening load when applied to the locking lever (32) is not transferred to the plunger (9).

* * * * *